US011963275B2

(12) United States Patent
Jiang et al.

(10) Patent No.: US 11,963,275 B2
(45) Date of Patent: *Apr. 16, 2024

(54) LIGHTING APPARATUS

(71) Applicant: XIAMEN ECO LIGHTING CO. LTD., Xiamen (CN)

(72) Inventors: Qiyi Jiang, Xiamen (CN); Bin Zhang, Xiamen (CN); Donghong Su, Xiamen (CN); Zhenyu Tang, Xiamen (CN)

(73) Assignee: XIAMEN ECO LIGHTING CO. LTD., Xiamen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/084,910

(22) Filed: Dec. 20, 2022

(65) Prior Publication Data

US 2023/0117349 A1 Apr. 20, 2023

Related U.S. Application Data

(63) Continuation of application No. 17/488,965, filed on Sep. 29, 2021, now Pat. No. 11,564,298.

(30) Foreign Application Priority Data

Sep. 29, 2020 (CN) ........................ 202022194086.X
Sep. 29, 2020 (CN) ........................ 202022194124.1
Sep. 29, 2020 (CN) ........................ 202022194231.4
Sep. 29, 2020 (CN) ........................ 202022199336.9
(Continued)

(51) Int. Cl.
*H05B 45/10* (2020.01)
*H05B 45/28* (2020.01)
*H05B 45/32* (2020.01)
*H05B 45/325* (2020.01)
(Continued)

(52) U.S. Cl.
CPC ......... *H05B 45/3725* (2020.01); *H05B 45/10* (2020.01); *H05B 45/28* (2020.01); *H05B 45/325* (2020.01)

(58) Field of Classification Search
None
See application file for complete search history.

(56) References Cited

U.S. PATENT DOCUMENTS

2021/0392729 A1* 12/2021 Zheng .................... H05B 45/10

FOREIGN PATENT DOCUMENTS

WO WO-2017127836 A1 * 7/2017 ............. H01H 9/287

* cited by examiner

*Primary Examiner* — Dedei K Hammond
(74) *Attorney, Agent, or Firm* — Chun-Ming Shih; LANWAY IPR SERVICES

(57) ABSTRACT

A lighting apparatus includes a rectifier, a 0-10V dimmer converter, a power circuit and a light source. The rectifier for receives an AC power from an AC input to generate a DC current. The TRIAC wall switch is selectively coupled to the AC input. The TRIAC wall switch is operated by a user with an first manual operation to suppress a portion of the AC power from the AC input corresponding to the first manual operation. The 0-10V dimmer converter is selectively coupled to a 0-10V dimmer. The 0-10V dimmer converts a dimmer voltage of the 0-10V dimmer to a dimmer signal corresponding to a second manual operation of the user. The power circuit is coupled to the 0-10V dimmer converter and the rectifier to convert the DC current to a set of driving current. The light source includes multiple LED modules.

19 Claims, 8 Drawing Sheets

(30) Foreign Application Priority Data

| | | |
|---|---|---|
| Sep. 29, 2020 | (CN) | 202022199490.6 |
| Sep. 29, 2020 | (CN) | 202022199527.5 |

(51) Int. Cl.

| | |
|---|---|
| ***H05B 45/37*** | (2020.01) |
| ***H05B 45/3725*** | (2020.01) |

LIGHTING APPARATUS

RELATED APPLICATION

The application is a continued application of U.S. patent application Ser. No. 17/488,965.

FIELD

The present invention is related to a lighting apparatus, and more particularly related to a lighting apparatus with flexible switches.

BACKGROUND

The time when the darkness is being lighten up by the light, human have noticed the need of lighting up this planet. Light has become one of the necessities we live with through the day and the night. During the darkness after sunset, there is no natural light, and human have been finding ways to light up the darkness with artificial light. From a torch, candles to the light we have nowadays, the use of light have been changed through decades and the development of lighting continues on.

Early human found the control of fire which is a turning point of the human history. Fire provides light to bright up the darkness that have allowed human activities to continue into the darker and colder hour of the hour after sunset. Fire gives human beings the first form of light and heat to cook food, make tools, have heat to live through cold winter and lighting to see in the dark.

Lighting is now not to be limited just for providing the light we need, but it is also for setting up the mood and atmosphere being created for an area. Proper lighting for an area needs a good combination of daylight conditions and artificial lights. There are many ways to improve lighting in a better cost and energy saving. LED lighting, a solid-state lamp that uses light-emitting diodes as the source of light, is a solution when it comes to energy-efficient lighting. LED lighting provides lower cost, energy saving and longer life span.

The major use of the light emitting diodes is for illumination. The light emitting diodes is recently used in light bulb, light strip or light tube for a longer lifetime and a lower energy consumption of the light. The light emitting diodes shows a new type of illumination which brings more convenience to our lives. Nowadays, light emitting diode light may be often seen in the market with various forms and affordable prices.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

In 1878, Thomas Edison tried to make a usable light bulb after experimenting different materials. In November 1879, Edison filed a patent for an electric lamp with a carbon filament and keep testing to find the perfect filament for his light bulb. The highest melting point of any chemical element, tungsten, was known by Edison to be an excellent material for light bulb filaments, but the machinery needed to produce super-fine tungsten wire was not available in the late 19th century. Tungsten is still the primary material used in incandescent bulb filaments today.

Early candles were made in China in about 200 BC from whale fat and rice paper wick. They were made from other materials through time, like tallow, spermaceti, colza oil and beeswax until the discovery of paraffin wax which made production of candles cheap and affordable to everyone. Wick was also improved over time that made from paper, cotton, hemp and flax with different times and ways of burning. Although not a major light source now, candles are still here as decorative items and a light source in emergency situations. They are used for celebrations such as birthdays, religious rituals, for making atmosphere and as a decor.

Illumination has been improved throughout the times. Even now, the lighting device we used today are still being improved. From the illumination of the sun to the time when human can control fire for providing illumination which changed human history, we have been improving the lighting source for a better efficiency and sense. From the invention of candle, gas lamp, electric carbon arc lamp, kerosene lamp, light bulb, fluorescent lamp to LED lamp, the improvement of illumination shows the necessity of light in human lives.

There are various types of lighting apparatuses. When cost and light efficiency of LED have shown great effect compared with traditional lighting devices, people look for even better light output. It is important to recognize factors that can bring more satisfaction and light quality and flexibility.

It is important to provide flexible settings to satisfy different needs of users.

When providing such function, it is also important to consider cost and complexity of the design so as to increase.

SUMMARY

In some embodiments, a lighting apparatus includes a rectifier, a 0-10V dimmer converter, a power circuit and a light source.

The rectifier for receives an AC power from an AC input to generate a DC current.

The TRIAC wall switch is selectively coupled to the AC input.

The TRIAC wall switch is operated by a user with an first manual operation to suppress a portion of the AC power from the AC input corresponding to the first manual operation.

The 0-10V dimmer converter is selectively coupled to a 0-10V dimmer.

The 0-10V dimmer converts a dimmer voltage of the 0-10V dimmer to a dimmer signal corresponding to a second manual operation of the user.

The power circuit is coupled to the 0-10V dimmer converter and the rectifier to convert the DC current to a set of driving current.

The light source includes multiple LED modules.

The light source receives the set of driving current to emit a light corresponding to the first manual operation and the second manual operation.

In some embodiments, the power circuit detects whether the TRIAC dimmer is coupled and whether the 0-10V dimmer is coupled to determine the set of driving current.

In some embodiments, the lighting apparatus may also include a first manual switch and a second manual switch and a switch converter coupled to the first manual switch and the second manual switch.

The first manual switch is operated to adjust a first light intensity with a first switch signal and the second manual switch is operated to adjust a first color temperature with a second switch signal.

The switch converter combines the first switch signal and the second switch signal to generate a set of PWM signals to the light source to generate a required light of the first light intensity and the first color temperature.

In some embodiments, the first manual switch and the second manual switch are disposed on a driver box for storing the rectifier and the power circuit.

In some embodiments, the first manual switch and the second manual switch are disposed on a light housing for storing the light source.

In some embodiments, the lighting apparatus may also include a third manual switch and a fourth manual switch.

The third manual switch is operated to adjust the first light intensity.

The fourth manual switch is operated to adjust the first color temperature.

A light housing conceals the first manual switch and the second manual switch and exposes the third manual switch and the fourth manual switch when the light housing is installed to a platform.

In some embodiments, the light housing is a downlight housing to be installed to a cavity.

The first manual switch and the second manual switch are concealed in the cavity after the downlight housing is installed to the cavity.

In some embodiments, the light housing is a bulb housing.

The first manual switch and the second manual switch are disposed on a lateral side of a cap of the bulb housing.

The third manual switch and the fourth manual switch are disposed on a bulb shell of the bulb housing.

In some embodiments, the third manual switch and the fourth manual switch are touch switches.

In some embodiments, the third manual switch receives a first gesture for increasing the first light intensity.

The fourth manual switch receives a second gesture for increasing the first color temperature.

In some embodiments, the third manual switch and the fourth manual switch are coupled to the switch converter.

The switch converter suppresses a setting of the first manual switch and the second manual switch when the third manual switch and the fourth manual switch activate changing of the setting.

In some embodiments, the power circuit includes two MOS transistors for respectively controlling current supply to two types of LED modules of the light source with two PWM signals generated by the switch converter.

In some embodiments, the power circuit lowers a color temperature automatically when lowering a light intensity of the light source.

In some embodiments, the power circuit increases the color temperature automatically when increasing the light intensity of the light source.

In some embodiments, the color temperature and the light intensity are changed with the TRIAC wall switch.

In some embodiments, the color temperature and the light intensity are changes with the 0-10V dimmer.

In some embodiments, the power circuit includes a resistor switch for respectively changing multiple resistor values of multiple types of LED modules of the light source to change the driving currents of the multiple LED modules.

In some embodiments, the resistor switch is operated by a resistor manual switch.

In some embodiments, an unified wall switch is connected to the power circuit for selecting a working mode in addition to setting a light intensity.

In some embodiments, different working modes correspond to different scenarios.

DETAILED DESCRIPTION

Figure 1:
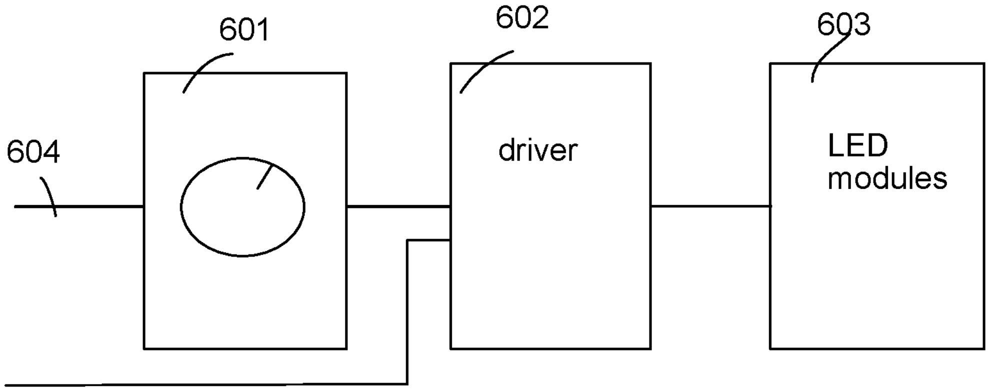
FIG. 1 illustrates a control diagram of a lighting apparatus embodiment.

FIG. 1 illustrates a lighting apparatus embodiment. In FIG. 1, the lighting apparatus may be connected to a first type wall switch 601, a second type wall switch or not connected to any wall switch at all. In this embodiment, no matter how the lighting apparatus is coupled, the lighting apparatus has a mechanism to keep normal function.

The wall switch 601 is coupled to a lighting apparatus that has a driver 602 and LED modules 603. An external power source like 100V AC (Alternating Current) power 604 is connected to the driver 602 and the wall switch 601.

In some embodiments, the wall switch 601 may be a TRIAC dimmer or a 0-10V dimmer.

TRIAC circuits are widely used, and very common in AC power control applications. These circuits have the ability to switch high voltages, as well as very high levels of current in the two parts of an AC waveform. They are semiconductor devices, similar to a diode.

TRIAC dimmer usually has a rotating, sliding or other type of operating switch like a touch panel.

TRIAC dimer is coupled to the AC power to suppress a portion of the AC power input, e.g. a portion of sine wave, and therefore decreasing certain amount of energy entering the lighting apparatus.

0-10 V is one of the earliest and simplest electronic lighting control signaling systems; simply put, the control signal is a DC voltage that varies between zero and ten volts. The controlled lighting should scale its output so that at 10 V, the controlled light should be at 100% of its potential output, and at 0 V it should at the lowest possible dimming level.

Figure 2:
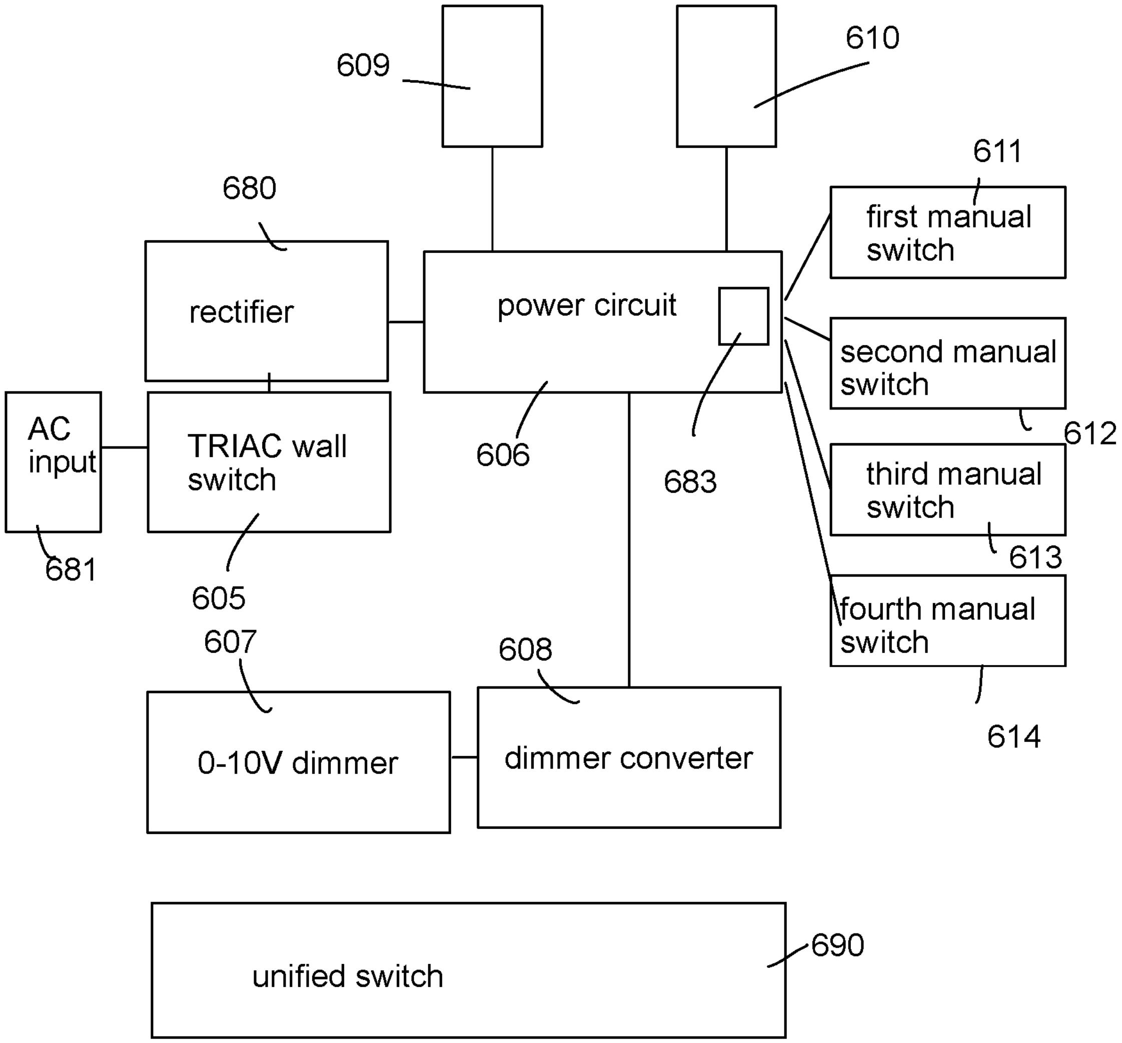
FIG. 2 shows a lighting apparatus embodiment for its structure.

Please refer to FIG. 2, which shows a lighting apparatus embodiment. The lighting apparatus Includes a rectifier 680, a 0-10V dimmer converter 608, a power circuit 606 and a light source including multiple LED modules 609, 610.

The rectifier 680 receives an AC power from an AC input to generate a DC current.

The TRIAC wall switch 605 is selectively coupled to the AC input 681. In other words, users may attach a TRIAC wall switch or users may connect the rectifier 680 directly to the AC input 681.

The TRIAC wall switch 605 is operated by a user with an first manual operation to suppress a portion of the AC power from the AC input corresponding to the first manual operation.

The 0-10V dimmer converter 608 is selectively coupled to a 0-10V dimmer 607.

The 0-10V dimmer 607 converts a dimmer voltage of the 0-10V dimmer to a dimmer signal corresponding to a second manual operation of the user.

The power circuit 606 is coupled to the 0-10V dimmer converter 608 and the rectifier 680 to convert the DC current to a set of driving current.

The light source includes multiple LED modules 609, 610. These LED modules may have different types with different color temperatures or colors so as to mix a required color temperature or color by supplying proper currents to these LED modules.

The light source receives the set of driving current to emit a light corresponding to the first manual operation and the second manual operation.

In some embodiments, the power circuit detects whether the TRIAC dimmer is coupled and whether the 0-10V dimmer is coupled to determine the set of driving current. For example, a configuration switch may be provided for users to select a working mode.

In some embodiments, the TRIAC dimmer may be detected if a certain part of power wave signal is suppressed. The 0-10V dimmer may be detected automatically by checking whether there is a voltage detected from a connector node for connecting to a 0-10V dimmer.

In some embodiments, the lighting apparatus may also include a first manual switch 611 and a second manual switch 612. A switch converter 683 is coupled to the first manual switch 611 and the second manual switch 612.

The first manual switch 611 is operated to adjust a first light intensity with a first switch signal and the second manual switch 612 is operated to adjust a first color temperature with a second switch signal.

Specifically, two separate switches are used respectively for setting the color temperature and the light intensity.

The switch converter 683 combines the first switch signal and the second switch signal to generate a set of PWM signals to the light source to generate a required light of the first light intensity and the first color temperature.

Figure 4:
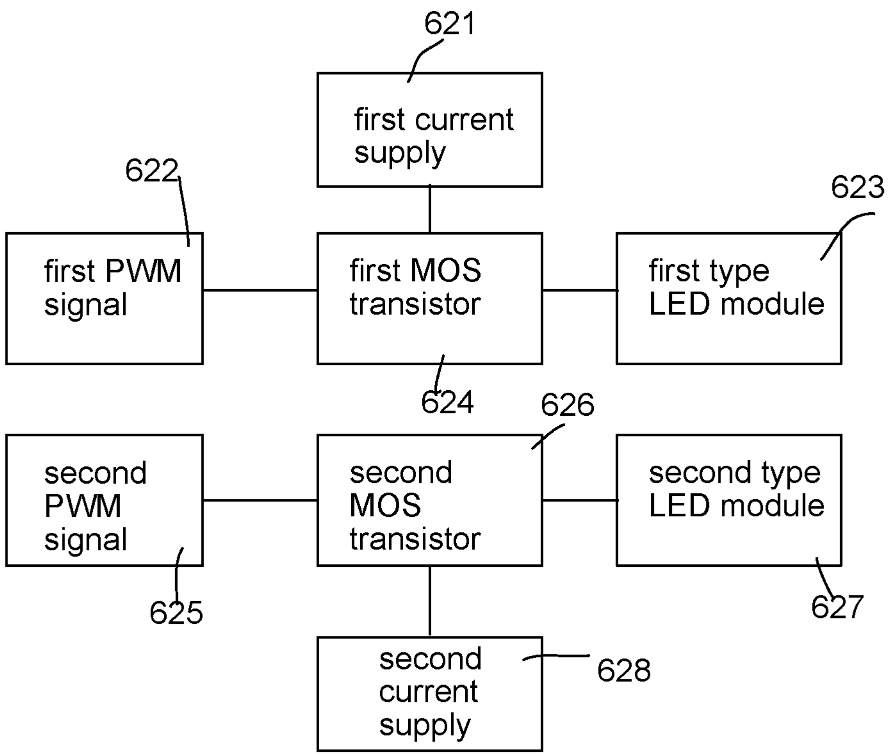
FIG. 4 shows a MOS transistor type example.

For example, FIG. 4 shows a first type LED module 623 and a second type LED module 627 with different color temperatures. The first PWM signal 622 and the second PWM signal 625 are calculated and generated based on the first light intensity and the first color temperature manually set by the user.

Figure 3:
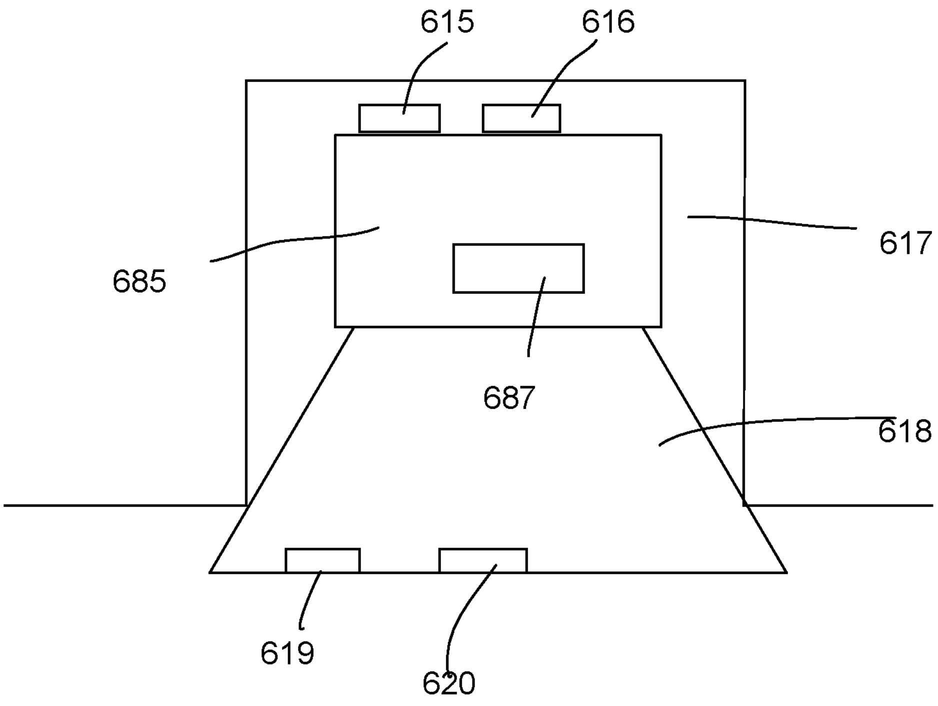
FIG. 3 shows a downlight device example.

In FIG. 3, the first manual switch 615 and the second manual switch 616 are disposed on a driver box 685 for storing the rectifier and the power circuit.

In some embodiments, the first manual switch and the second manual switch are disposed on a light housing 618 for storing the light source.

In FIG. 2, the lighting apparatus may also include a third manual switch 613 and a fourth manual switch 614.

The third manual switch 613 is operated to adjust the first light intensity.

The fourth manual switch 614 is operated to adjust the first color temperature.

In other words, there are two sets of manual switches for setting a same parameter.

In FIG. 3, a light housing 618 conceals the first manual switch 615 and the second manual switch 616 and exposes the third manual switch 619 and the fourth manual switch 620 when the light housing 618 is installed to a platform like a cavity 617 or a junction box.

In some embodiments, the light housing is a downlight housing to be installed to a cavity.

The first manual switch and the second manual switch are concealed in the cavity after the downlight housing is installed to the cavity, as illustrated in FIG. 3.

Figure 5:
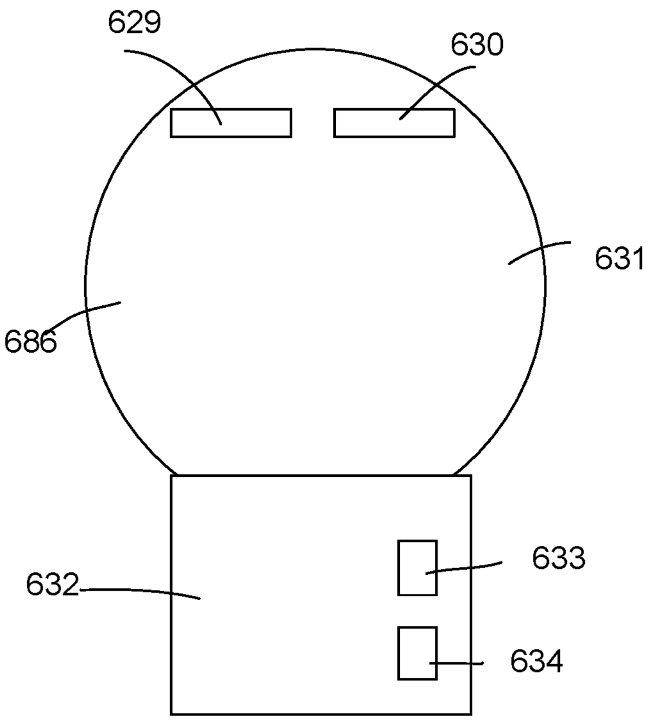
FIG. 5 shows a light bulb device example.

In FIG. 5, the light housing is a bulb housing 686.

The first manual switch 633 and the second manual switch 634 are disposed on a lateral side 632 of a cap of the bulb housing 686.

The third manual switch 629 and the fourth manual switch 630 are disposed on a bulb shell 631 of the bulb housing 686.

In some embodiments, the third manual switch and the fourth manual switch are touch switches.

In some embodiments, the third manual switch receives a first gesture for increasing the first light intensity.

The fourth manual switch receives a second gesture for increasing the first color temperature.

In FIG. 3, the third manual switch 619 and the fourth manual switch 620 are coupled to the switch converter 687.

The switch converter 687 suppresses a setting of the first manual switch and the second manual switch when the third manual switch 619 and the fourth manual switch 620 activate changing of the setting.

In FIG. 4, the power circuit includes two MOS transistors 624, 625 for respectively controlling current supply to two types of LED modules 623, 627 of the light source with two PWM signals 622, 625 generated by the switch converter.

The MOS transistors stops or allows the first current supply 621 and the second current supply 628 respectively entering the first type LED module 623 and the second type LED module 627.

PWM (Pulse Width Modulation) signal is a digital signal with a duty ratio over time to turn on and rest time to turn off the connected LED module. Therefore, the current is allowed to enter the first type LED module 623 based on the timing of the first PWM signal 622.

In some embodiments, the power circuit lowers a color temperature automatically when lowering a light intensity of the light source.

In some embodiments, the power circuit increases the color temperature automatically when increasing the light intensity of the light source.

Figure 6:
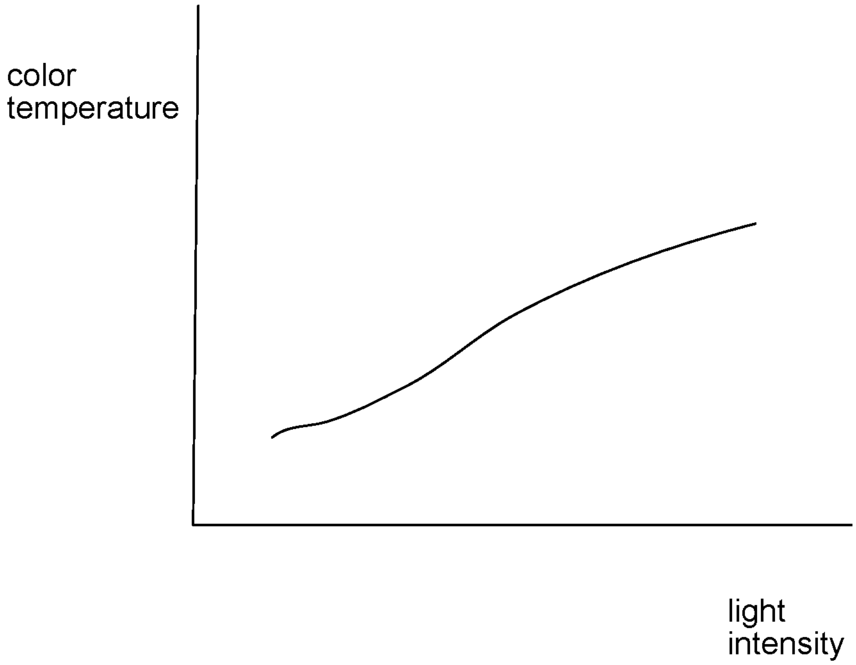
FIG. 6 shows a color temperature and light intensity relation.

FIG. 6 shows a relation between the color temperature and the light intensity. When users only change the light intensity, a corresponding color temperature is found via a table or a function by the driver to mix a corresponding light intensity and further in combination of a corresponding color temperature.

Such design simulates the sun light, which may change color temperature and the light intensity at the same time with a mapping relation.

In some embodiments, the color temperature and the light intensity are changed with the TRIAC wall switch.

In some embodiments, the color temperature and the light intensity are changes with the 0-10V dimmer.

Figure 7:
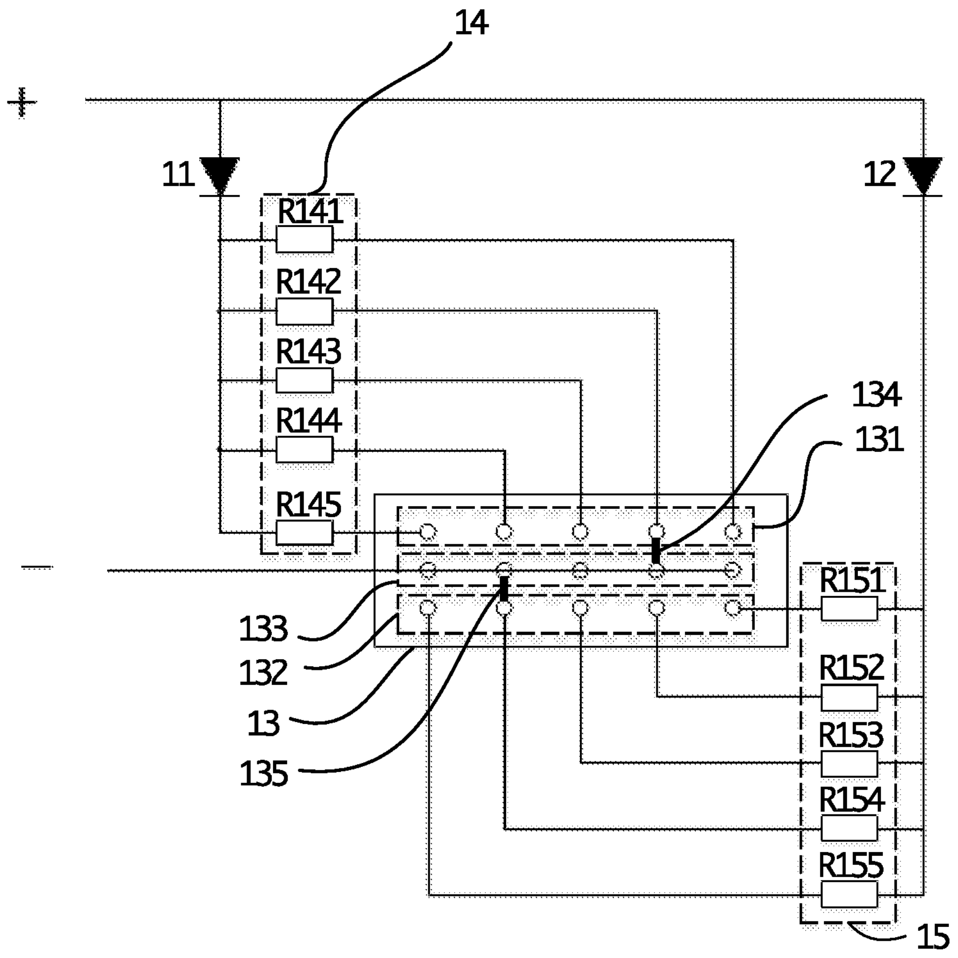
FIG. 7 shows a resistor switch example.

In FIG. 7, the power circuit includes a resistor switch 13 for respectively changing multiple resistor values of multiple types of LED modules of the light source to change the driving currents of the multiple LED modules.

In FIG. 7, the connection paths 131, 132, 133, 134, 135 are electrically connected to change resistor values for the first type LED module 11 and the second type LED module 12 on the connecting path. Corresponding resistors 14 and 15 are coupled to change the currents flowing to the first type LED module 11 and the second type LED module 12.

In some embodiments, the resistor switch 13 is operated by a resistor manual switch.

In FIG. 1, a unified wall switch 690 is connected to the power circuit 606 for selecting a working mode in addition to setting a light intensity.

In some embodiments, different working modes correspond to different scenarios.

Figure 8:
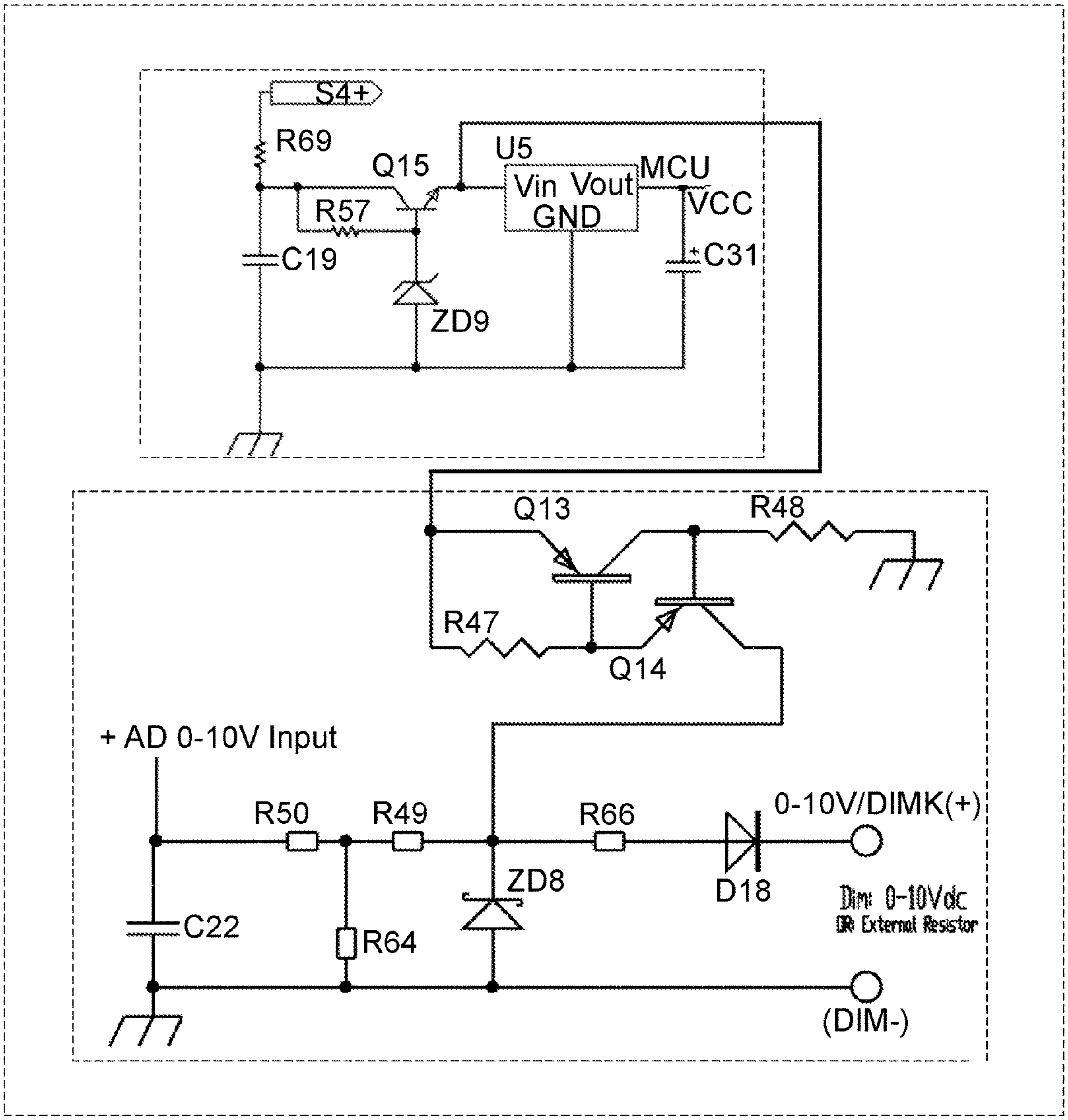
FIG. 8 shows a 0-10V signal converter example.

FIG. 8 shows a signal converter for converting 0-10V dimmer signal.

Please be noted that two LED modules, two PWM signals are illustrated as an example but they are not used for limiting the invention scope. For example, more than two LED modules or PWM signals may be used in different embodiments.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:

a rectifier for receiving an AC power from an AC input to generate a DC current;

a 0-10V dimmer converter for selectively coupled to a 0-10V dimmer, wherein the 0-10V dimmer converter converts a dimmer voltage of the 0-10V dimmer to a dimmer signal corresponding to a second manual operation of the user;

a power circuit for coupling to the 0-10V dimmer converter and the rectifier to convert the DC current to a set of driving current; and a light source comprising multiple LED modules, wherein the light source receives the set of driving current to emit a light corresponding to the second manual operation, wherein the power circuit lowers a color temperature automatically when lowering a light intensity of the light source, wherein the power circuit detects whether the 0-10V dimmer is coupled to determine the set of driving current.

2. The lighting apparatus of claim 1, wherein a TRIAC wall switch is selectively coupled to the AC input, wherein the TRIAC wall switch is operated by a user with a first manual operation to suppress a portion of the AC power from the AC input corresponding to the first manual operation.

3. The lighting apparatus of claim 1, further comprising a first manual switch and a second manual switch and a switch converter coupled to the first manual switch and the second manual switch, wherein the first manual switch is operated to adjust a first light intensity with a first switch signal and the second manual switch is operated to adjust a first color temperature with a second switch signal, wherein the switch converter combines the first switch signal and the second switch signal to generate a set of PWM signals to the light source to generate a required light of the first light intensity and the first color temperature.

4. The lighting apparatus of claim 3, wherein the first manual switch and the second manual switch are disposed on a driver box for storing the rectifier and the power circuit.

5. The lighting apparatus of claim 3, wherein the first manual switch and the second manual switch are disposed on a light housing for storing the light source.

6. The lighting apparatus of claim 3, further comprising a third manual switch and a fourth manual switch, wherein the third manual switch is operated to adjust the first light intensity, wherein the fourth manual switch is operated to adjust the first color temperature, wherein a light housing conceals the first manual switch and the second manual switch and exposes the third manual switch and the fourth manual switch when the light housing is installed to a platform.

7. The lighting apparatus of claim 6, wherein the light housing is a downlight housing to be installed to a cavity, wherein the first manual switch and the second manual switch are concealed in the cavity after the downlight housing is installed to the cavity.

8. The lighting apparatus of claim 6, wherein the light housing is a bulb housing, wherein the first manual switch and the second manual switch are disposed on a lateral side of a cap of the bulb housing, wherein the third manual switch and the fourth manual switch are disposed on a bulb shell of the bulb housing.

9. The lighting apparatus of claim 6, wherein the third manual switch and the fourth manual switch are touch switches.

10. The lighting apparatus of claim 9, wherein the third manual switch receives a first gesture for increasing the first light intensity, wherein the fourth manual switch receives a second gesture for increasing the first color temperature.

11. The lighting apparatus of claim 6, wherein the third manual switch and the fourth manual switch are coupled to the switch converter, wherein the switch converter suppresses a setting of the first manual switch and the second manual switch when the third manual switch and the fourth manual switch activate changing of the setting.

12. The lighting apparatus of claim 3, wherein the power circuit comprises two MOS transistors for respectively controlling current supply to two types of LED modules of the light source with two PWM signals generated by the switch converter.

13. The lighting apparatus of claim 12, wherein the power circuit increases the color temperature automatically when increasing the light intensity of the light source.

14. The lighting apparatus of claim 13, wherein the color temperature and the light intensity are changed with a TRIAC wall switch.

15. The lighting apparatus of claim 13, wherein the color temperature and the light intensity are changed with the 0-10V dimmer.

16. The lighting apparatus of claim 1, wherein the power circuit comprises a resistor switch for respectively changing multiple resistor values of multiple types of LED modules of the light source to change the driving currents of the multiple LED modules.

17. The lighting apparatus of claim 16, wherein the resistor switch is operated by a resistor manual switch.

18. The lighting apparatus of claim 1, wherein an unified wall switch is connected to the power circuit for selecting a working mode in addition to setting a light intensity.

19. The lighting apparatus of claim 18, wherein different working modes correspond to different scenarios.

* * * * *